Oct. 27, 1970  D. K. SWICK ET AL  3,535,906

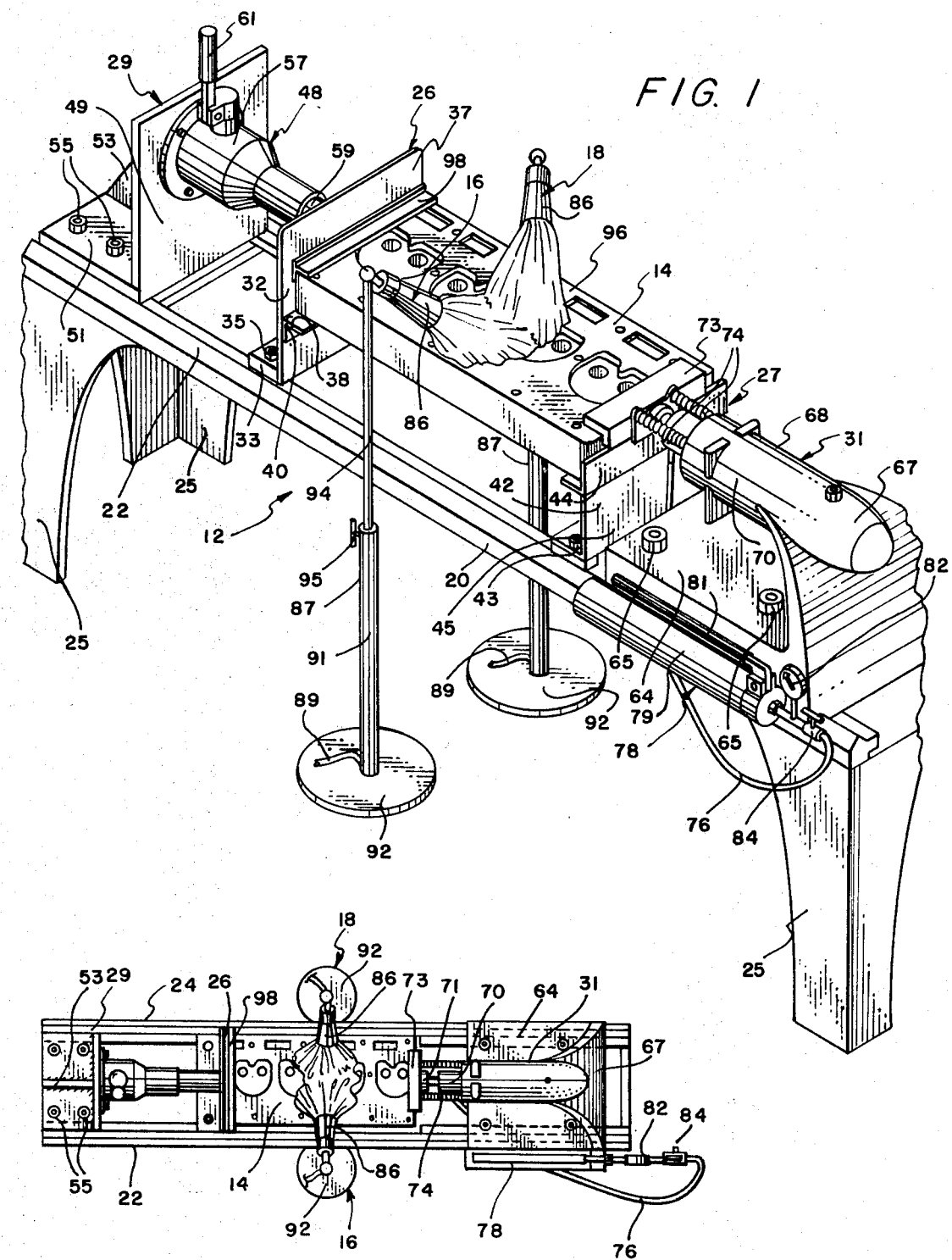

CYLINDER HEAD STRAIGHTENING METHOD

Filed Sept. 3, 1968  2 Sheets-Sheet 2

INVENTOR.
CLARENCE E. SWICK
DWAIN K. SWICK
BY
ATTORNEYS

United States Patent Office 3,535,906
Patented Oct. 27, 1970

3,535,906
CYLINDER HEAD STRAIGHTENING METHOD
Dwain K. Swick and Clarence E. Swick, both of 400 N. Chestnut, McPherson, Kans. 67460
Filed Sept. 3, 1968, Ser. No. 756,802
Int. Cl. B21d 3/00
U.S. Cl. 72—342
8 Claims

ABSTRACT OF THE DISCLOSURE

This invention relates to a method of straightening a warped surface, and, more particularly, to a method of repairing warped cylinder heads. Still, more specifically, this invention relates to a method of straightening warped cylinder heads by the concurrent application of heat and pressure. In more detail, this invention relates to a method of straightening warped cylinder heads by the application of heat at a predetermined warped location to raise the affected area to a given temperature concurrent with the use of pressure applied to opposite ends of the cylinder head to straighten same whereupon the pressure and temperature is immediately removed.

---

It has become common practice to repair cracks and defects found in engine cylinder heads and blocks by the process of removing, plugging, welding and final machining thereon. However, in the repair of warped cylinder heads, it has been the normal practice to scrap the same as it was thought that little could be done to straighten them unless the head material is of sufficient thickness so head could be milled flat.

In accordance with the present invention, a new method of straightening cast iron objects or warped cylinder heads is provided involving a support means having a pair of spaced, relatively movable bracket members adaptable to vertically support a cylinder head therebetween. Means are provided to apply pressure to upper opposite ends of the cylinder head to achieve a concentrated compression force along an upper surface or plane thereof. A pair of torch stands are provided to direct a concentrated heat to the warped area of the cylinder head. The method of this invention involves applying the aforementioned heat and pressure to the cylinder head and immediately removing the same when reaching the heat of approximate range of transformation of the cylinder head material involved.

In preferred specific embodiments of the invention, the method of this invention is operable to straighten cast iron objects and, specifically, warped cylinder heads by first determining by measurement the area of warpage and supporting the head convex side up at opposite ends and then applying a predetermined pressure across the upper plane thereof. Next, an intense heat is applied to the specific warped area of the cylinder head to raise the temperature of this controlled area. The pressure being applied is carefully observed through a gauge as the heat will elongate the cylinder head and, concurrently, cause an increase in pressure. On reaching the heat of approximate transformation of the cylinder head material, the pressure will cease to increase as the material begins to give and, if the heat and pressure are not removed, the pressure could act to severely distort the cylinder head. The point of cessation of pressure increase and noting a slight pressure drop is the indication to the operator to immediately remove the heat and pressure thereby resulting in a straightening of the subject cylinder head.

Accordingly, it is an object of this invention to provide a new and novel means of straightening cast iron objects involving the controlled application of heat and pressure.

Another object of this invention is to provide a new method of straightening warped cylinder heads operable to apply a given pressure across an upper convex plane thereof and provide an intense heating means to the warped defective area of the cylinder head to provide for the ready straightening thereof.

One further object of this invention is to provide a method of straightening warped cylinder heads involving the steps of applying a given pressure across an upper convex plane of the cylinder head, applying intense heat to the warped area of the cylinder head, observing the pressure increase due to the heating and resultant expansion of the cylinder head, and immediately removing the heat and pressure concurrently on reaching the heat range of approximate transformation of the cylinder head material whereupon the straightening has taken place.

One further object of this invention is to provide a method of straightening cylinder heads that is simple to follow, economical to use, and readily adaptable to various sizes, shapes and configurations of cylinder heads providing for straightening without the necessity of the scrapping thereof.

Still, one further object of this invention is to provide a method of straightening cast iron objects which requires low capital investment and can be readily followed and duplicated by a skilled operator.

Various other objects, advantages and features of the invention will become apparent to those skilled in the art from the following discussion, taken in conjunction with the accompanying drawings, in which:

FIG. 1 is a fragmentary perspective view of the pressure stand with head in place and heating elements needed to practice the method of this invention;

FIG. 2 is a reduced top plan view illustrating the elements required to practice the method of this invention.

Figure 3:
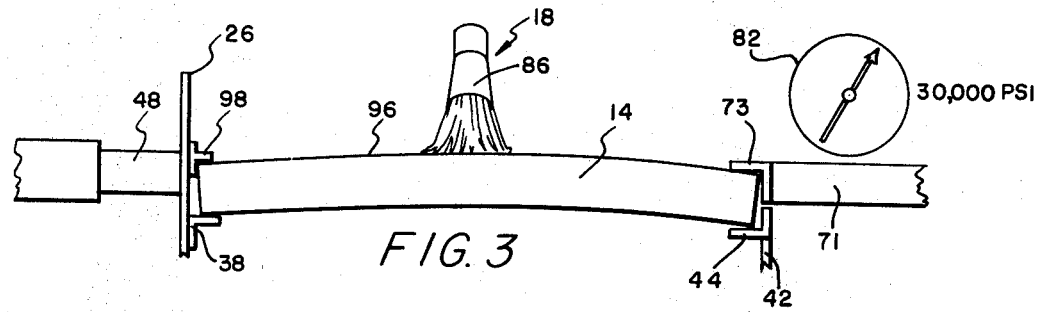
FIGS. 3, 4 and 5 are schematic diagrams illustrating the various steps in the process and method of this invention in straightening a warped cylinder head by the application of heat and pressure.

The following is a discussion and description of preferred specific embodiments of the new cylinder head straightening method of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, the practice of the method of this invention involves the use of a support means 12 operable to apply pressure to a cylinder head 14 and a pair of torch means 16 and 18 to apply heat thereto.

The support means 12 includes a base stand 20 having a pair of elongated parallel guide rails 22 and 24 mounted on leg members 25. The guide rails 22 and 24 resemble a conventional lathe structure on which is mounted a pair of spaced bracket members 26 and 27; a stationary pressure plate 29; and a pressure applicator structure 31 all movable longitudinally on the guide rails 22 and 24 for use with various sizes and shapes of cylinder heads 14. The bracket member 26 includes an L-shaped main body 32 having a short leg 33 slidably mounted on the guide rails 22 and 24 and anchored in the desired position by bolt and nut members 35. On the other leg 37 of the main body 32 is secured an angle iron member 38 as by welding or the like. It is seen that the angle iron member 38 provides a horizontally extended ledge 40 adapted to support one end of the cylinder head 14 thereon. The other bracket member 27 is substantially identical having an L-shaped body 42 secured as by bolts and nut members 43 to the guide rails 22 and 24. However, an angle iron member 44 is welded to the top edge of an upright leg 45 of the body 42 and opens upwardly toward the other bracket member 26 so as to vertically support the other end of the cylinder head 14.

As shown in FIGS. 1 and 2, the stationary pressure plate 29 includes an adjustable cylinder assembly 48 mounted on an upright plate 49. A bottom plate 51 secured to the upright plate 49 is given rigidity by a gusset plate 53 welded thereto and is releasably secured to the guide rails 22 and 24 by nut and bolt members 55. The cylinder assembly 48 has a main cylinder 57 secured to the upright plate 49, a smaller cylinder 59 telescopically movable within the main cylinder 57; and a locking lever 61 engageable with the smaller cylinder 59 to rigidly hold the same in a given axially adjustable position. It is seen that the forward end of the smaller cylinder 59 is engageable with and may be anchored to the bracket member 26 and acts to resist pressure thereagainst in the practice of the method of this invention as will be explained.

The pressure applicator structure 31 includes a heavy, solid bed or base 64 secured as by nut and bolt assemblies 65 to the guide rails 22 and 24. A cylindrical head 67 is mounted on the base 64 and includes a piston and cylinder assembly 68 mounted on the forward portion thereof. The piston and cylinder assembly 68 has a cylinder member 70 with a piston member 71 axially movable therein. The outer end of the piston member 71 is engageable with a pressure plate 73 which is held in engagement therewith by a pair of tension spring members 74. The cylinder member 70 is supplied with fluid under pressure through a hose member 76 connected to a pump means 78. As shown in FIG. 1, the pump means 78 includes a cylinder 79 having a piston therein (not shown) actuated in a conventional manner by a hand lever 81 with the pressure created in the cylinder 79 indicated by a gauge 82 mounted on the hose member 76. Additionally, a pressure release valve 84 mounted on the hose member 76 is operable to release pressure therefrom as required.

The torch means 16 and 18 are provided with head or cone members 86 mounted on support stands 87 with natural gas or the like supplied through lines 89 to the cone members 86 for ignition. More specifically, the support stands 87 are provided with a first element 91 mounted on a support base 92, second elements 94 having one end secured to the cone members 86 and the other ends telescopically mounted in the respective first elements 91, and latch members 95 secured to the first elements operable to anchor the first and second elements 91 and 94 to each other on placing the cone members 86 at a desired height.

Figure 4:
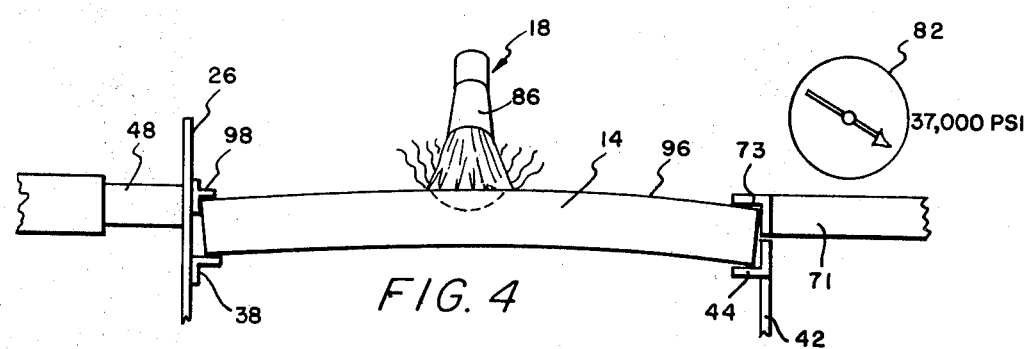
Figure 5:
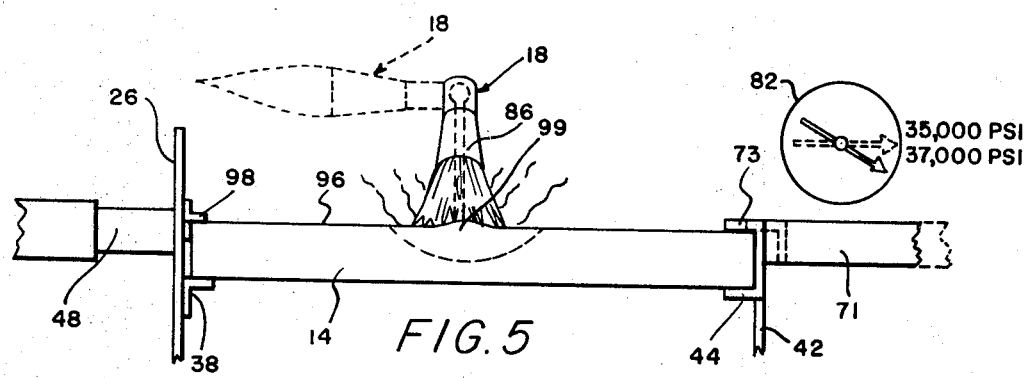

In the operation of the method of this invention as indicated in FIGS. 3, 4 and 5, the defective cylinder head 14 is closely inspected by conventional measuring means to determine the amount and location of the warped area. This is readily accomplished by measurement of several known reference points such as distance between valve openings, mounting holes, etc. Due to size and mass of the part, side warpage is normally within manufacturers' tolerances, but length warpage is the area where rework is required and results in an upper convex surface 96.

The warped cylinder head 14 is supported vertically on the spaced angle iron members 38 and 44 of the bracket members 26 and 27, respectively, with the convex surface 96 facing up. A special plate 98 of T-shape in transverse cross section is mounted between the leg 37 and the adjacent end of the cylinder head 14 so as to limit the application of pressure to an upper plane of the cylinder head 14. Similarly, the pressure plate 73 at the opposite end of cylinder head 14 is engageable with the upper portion thereof whereby the compression pressure force is restricted to the top plate or upper wall of the cylinder head 14 which, in turn, is of a box-like configuration in transverse cross section having cylinder openings, coolant channels, etc. therein. The cross section of the upper wall of the cylinder head 14 is approximately one-half inch.

Next, the handle lever 81 of the pump means 78 is actuated to move the piston 71 and interconnected pressure plate 73 to apply 20,000 to 35,000 pounds per square inch to the cylinder head 14 as indicated on the gauge 82. This applies a considerable pressure across the top wall of the cylinder head 14 with the pressure within the cylinder 70 being removable therefrom on the opening of the pressure release valve 84 when required as will be explained.

The torch means 16 and 18 are thereupon ignited, placed adjacent the cylinder head 14, and directed unto the warped area of the convex surface 96 of the cylinder head 14. This results in an intense heating in a limited area of the cylinder head 14 in the top wall as shown in dotted lines in FIG. 4. As the heat is applied, the cylinder head 14 will expand with a resultant gradual pressure increase against the pressure plate 73 as shown by the increase from an example initial reading of 30,000 pounds per square inch in FIG. 3 to a reading of 37,000 pounds per square inch in FIG. 4.

The steady pressure increase on the gauge 82 was due to the application of heat and reaction of the expanding cylinder head 14 against the pressure plates 98 and 73. Concurrently, the heat tends to weaken the compression resistance of the cylinder head 14 toward a temperature in the heat range of transformation of the cylinder head material, namely, 1200–1400° F. As shown in FIG. 5, the pressure may reach 37,000 pounds per square inch and suddenly stop raising and begin to retreat from this high reading. The application of heat necessary to raise the temperature sufficiently normally takes 3–6 minutes. Because of the limited heated area and the method of applying pressure, the weakening of the cylinder head 14 by the heat and reaching the range of transformation, the pressure will tend to rotate opposite ends of the cylinder head 14 upwardly as shown in FIG. 5 resulting in a straightening operation thereof.

It is obvious, therefore, that on reaching the approximate heat range of transformation, the heat must be quickly removed from the cylinder head 14 which is shown in dotted lines in FIG. 5 and can be accomplished merely by turning the cone members 86 away or off applying heat to the cylinder head 14. Concurrently, the pressure release valve 84 is rapidly opened so that the pressure is completely taken off the cylinder head 14 by escape of the pressure from the cylnder 70. This removal of heat and pressure can be accomplished from 0.5 to 25 seconds depending on location of operator and various elements. As shown, in FIG. 5, a straightening of the cylinder head 14 results in a residual upheaval 99 in the heated portion of the cylinder head 14 which is readily removed in further machining operations.

More specifically, in the straighening of a model D–4 Caterpillar cylinder head constructed of a conventional cast iron material, it has been found by actual testing that use of an initial application of pressure equal to 30,000 pounds per square inch to opposite ends of the cylinder head is desired. Next, the application of intense heat through the torch means 16 and 18 to the warped area thereof for a period of 4 minutes and 20 seconds results in the heated area attaining a light red glow therein indicating that the temperature of the material has reached approximately 1300° F. which is the heat range of approximate transformation of the cast iron material. Although the pressure increase on the cylinder head with the application of heat will vary depending on the severity of warpage and variance in the cylinder head material, it has been found that with this cylinder head having a warpage of .035 inch and using an initial compressive force of 30,000 pounds per square inch, it was found that the pressure will raise to 39,000 pounds per square inch before the pressure rise ceased thereby indicating the heat range of transformation. Thereupon, the heat and pressure were quickly removed in 11 seconds resulting in a straightening of the cylinder head as shown in FIG. 5. This resulted in a leveling of the upper surface of the cylinder head to within .010 inch and an overall shortening of the warped convex surface of about .031 inch. This placed the cylinder head well within acceptable manufacturers' tolerances for further rebuild operations.

As will be apparent from the foregoing descriptions of preferred embodiments of applicants' method of straightening warped cylinder heads, a relatively simple and inexpensive method has been provided which is readily adaptable to present day cylinder head rebuilding operation. It is seen that the method of straightening warped cylinder heads of this invention can be readily accomplished with a minimum amount of capital investment, requires limited skill by an operator, and provides effective and efficient means of saving warped cylinder heads which, in the past, were scrapped.

While the invention has been described in connection with preferred specific embodiments thereof, it is to be understood that this description is intended to illustrate and not to limit the scope of the invention, which is defined by the following claims.

We claim:

1. A method of straightening a warped cast iron casting comprising the following steps:
   (a) mounting said casting between spaced end supports,
   (b) applying force on an end of said casting longitudinal thereof,
   (c) heating the warped portion of said casting, and
   (d) discontinuing heating and removing the force from said casting on reaching the temperature of approximate transformation of the casting material and thereby reshaping said casting.

2. A method as described in claim 1, wherein:
   (a) on applying force transmitting same through angle members contacting the upper portions of said casting so as to apply compression through the upper plane thereof only.

3. A method as described in claim 1, wherein:
   (a) on heating the warped portion of said casting, raising the temperature to approximately 1350° F. being the temperature of transformation of the casting material whereby said casting is moved inwardly under the force applied thereto.

4. A method as described in claim 1, wherein:
   (a) applying force at upper opposite ends of said casting resulting in a compression of the upper plane thereof, the force being in the range of 20,000 to 35,000 pounds per square inch,
   (b) on heating the warped portion, raising the temperature thereof between 1200–1400° F., and
   (c) on the removing of the heat and pressure, the time therefor indicated by cessation of pressure increases due to the application of heat to said casting with the casting material reaching the approximate temperature of transformation.

5. A method as described in claim 1, including:
   (a) observing the pressure on said casting on applying heat thereto, such pressure raising due to an expansion of said casting, and
   (b) noting the point at which the pressure ceases increasing as said casting begins to compress under the pressure thereby signifying the exact time to remove the heat and pressure.

6. A method as described in claim 1, wherein:
   (a) on applying pressure, regulating the initial compression force on upper opposite ends of said casting to 20,000–30,000 pounds per square inch,
   (b) on heating the warped portion raising the temperature of said warped portion to 1300–1400° F., and
   (c) on removing the heat and pressure, such being done at the time the pressure stops increasing due to temperature elongation of said casting indicating the point of the approximate heat range of transformation.

7. A method as described in claim 6, wherein:
   (a) on removing the heat and pressure, the same being done within .5–25 seconds after the casting material reaches the approximate heat range of transformation as indicated by color of said casting and cessation of pressure increase.

8. A method as described in claim 1, including:
   (a) before mounting said casting, measuring said casting to determine amount of warpage.
   (b) mounting said casting with a convex side faced upwardly, and
   (c) applying the heat to said convex side to raise the defective area to the approximate heat range of transformation.

References Cited

UNITED STATES PATENTS

| 2,428,825 | 10/1947 | Arnoldy | 148—130 |
| 3,210,223 | 10/1965 | Good | 148—131 |

LOWELL A. LARSON, Primary Examiner

U.S. Cl. X.R.

148—131